(12) United States Patent
Shammoh

(10) Patent No.: US 9,222,840 B1
(45) Date of Patent: Dec. 29, 2015

(54) DUAL TEMPERATURE SENSOR FOR AN ENGINE

(71) Applicant: Ali A. A. J. Shammoh, Safat (KW)

(72) Inventor: Ali A. A. J. Shammoh, Safat (KW)

( * ) Notice: Subject to any disclaimer, the term of this patent is extended or adjusted under 35 U.S.C. 154(b) by 0 days.

(21) Appl. No.: 14/706,781

(22) Filed: May 7, 2015

(51) Int. Cl.
*G01K 1/02* (2006.01)
*F01P 11/16* (2006.01)
*G01K 13/02* (2006.01)
*G01K 13/00* (2006.01)
*G01M 15/04* (2006.01)

(52) U.S. Cl.
CPC ............... *G01K 1/026* (2013.01); *F01P 11/16* (2013.01); *G01K 13/00* (2013.01); *G01K 13/02* (2013.01); *G01M 15/048* (2013.01)

(58) Field of Classification Search
CPC .... G01K 1/026; G01K 1/143; G01K 2205/00
USPC .................. 374/100, 144, 145, 146, 208, 189
See application file for complete search history.

(56) References Cited

U.S. PATENT DOCUMENTS

| | | | |
|---|---|---|---|
| 3,356,807 A | 12/1967 | Brown et al. | |
| 3,886,912 A | 6/1975 | Haglund | |
| 5,019,799 A | 5/1991 | Oshiage et al. | |
| 5,201,840 A | 4/1993 | Sausner et al. | |
| 5,669,337 A | 9/1997 | Drouillard | |
| 6,026,679 A | 2/2000 | Holmes et al. | |
| 6,425,293 B1 | 7/2002 | Woodroffe et al. | |
| 7,069,883 B2 | 7/2006 | Atkins | |
| 8,454,232 B2* | 6/2013 | Stoll et al. | 374/208 |
| 2002/0085617 A1* | 7/2002 | Gul | 374/208 |
| 2003/0147452 A1* | 8/2003 | Adachi et al. | 374/185 |
| 2004/0184507 A1* | 9/2004 | Tsukamoto et al. | 374/57 |
| 2009/0168832 A1* | 7/2009 | Bauerle | 374/1 |
| 2010/0284437 A1* | 11/2010 | Stoll et al. | 374/143 |
| 2013/0156065 A1* | 6/2013 | Graf | 374/145 |
| 2013/0205744 A1 | 8/2013 | Berkyto | |

FOREIGN PATENT DOCUMENTS

GB    2 083 231 A    3/1982

OTHER PUBLICATIONS

"*Engine Temperature Sensor & Overheating Alarm,*" http://www. http://enginewatchdog.com/ Last Accessed on Jun. 30, 2014 (3 pages).

* cited by examiner

*Primary Examiner* — Lisa Caputo
*Assistant Examiner* — Philip Cotey
(74) *Attorney, Agent, or Firm* — Richard C. Litman

(57) ABSTRACT

The dual temperature sensor for an engine includes a first sensor configured for detecting the temperature of an engine and for generating at least one information signal corresponding to the detected temperature of the engine, and a second sensor configured for detecting the temperature of the engine coolant and for generating at least one information signal corresponding to the detected temperature of the engine coolant within the engine. An insulator is positioned between the first sensor and the second sensor. The dual temperature sensor is mounted in the thermostat housing such that the first sensor of the dual temperature sensor is positioned outside the thermostat housing wall so that the first sensor is in communicating relation with the engine and the second sensor of the dual temperature sensor is positioned inside the thermostat housing in communicating relation with the engine coolant.

2 Claims, 7 Drawing Sheets

DUAL TEMPERATURE SENSOR FOR AN ENGINE

BACKGROUND OF THE INVENTION

1. Field of the Invention

The present invention generally relates to motor vehicle sensors, and more particularly, to a dual temperature sensor for an engine that can measure both the temperature of the engine coolant and the temperature of the engine.

2. Description of the Related Art

Normally, an internal combustion engine operates within a temperature range of between 200° F. and 250° F. If the temperature of the engine increases beyond 250° F. significant damage to the engine can result, up to and including the destruction of the engine. As such, to prevent an engine from overheating, engine coolant is pumped through an engine's cooling jackets, which are typically positioned alongside the engine. To determine the temperature of the engine, a coolant sensor is used to measure the temperature of the engine coolant within the engine. The temperature of the engine coolant can, in turn, be used to determine the temperature of a car engine.

Since the typical coolant sensors rely solely on the temperature of the coolant to measure the temperature of the engine, they can be rendered ineffective if, for example, there is a leak in the radiator or the radiator hoses that causes the engine coolant to drain from the engine. If the coolant escapes from the engine due to a leak, the only temperature that can be measured will be that of the ambient air instead of the temperature of the engine coolant. Therefore, it would impossible to determine whether an engine is overheating.

Thus, a dual temperature sensor for an engine solving the aforementioned problems is desired.

SUMMARY OF THE INVENTION

The dual temperature sensor for an engine includes a first sensor configured for detecting the temperature of an engine and for generating at least one information signal corresponding to the detected temperature of the engine, and a second sensor configured for detecting the temperature of the engine coolant and for generating at least one information signal corresponding to the detected temperature of the engine coolant within the engine. A plurality of electrical delivery ports are disposed on the top portion of the dual temperature sensor, the plurality of electrical ports being configured for receiving electricity from a power source. An insulator is positioned between the first sensor and the second sensor. The dual temperature sensor is mounted in the thermostat housing such that the first sensor of the dual temperature sensor is positioned outside the thermostat housing wall so that the first sensor is in communicating relation with the engine and the second sensor of the dual temperature sensor is positioned inside the thermostat housing in communicating relation with the engine coolant.

The dual temperature sensor may have a housing to house the first sensor. Further, the dual temperature sensor is configured to communicate with an engine control system to activate an alert if the temperature of the engine coolant and/or the temperature of the engine rise above a predetermined temperature for the particular engine.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1-7, the dual temperature sensor 100 for an engine E has a top portion 110 and a first sensor 135 that extends external to the engine and is configured for detecting the temperature of the engine E and for generating at least one information signal corresponding to the detected temperature of the engine E. The dual temperature sensor 100 also has a second sensor 150 extending into the engine E that is configured for detecting the temperature of the engine coolant and for generating at least one information signal corresponding to the detected temperature of the engine coolant (such as water) within the engine E. The first sensor 135 and the second sensor 150 can be can be configured to measure the temperature of the engine E and the engine coolant substantially simultaneously.

Figure 4:
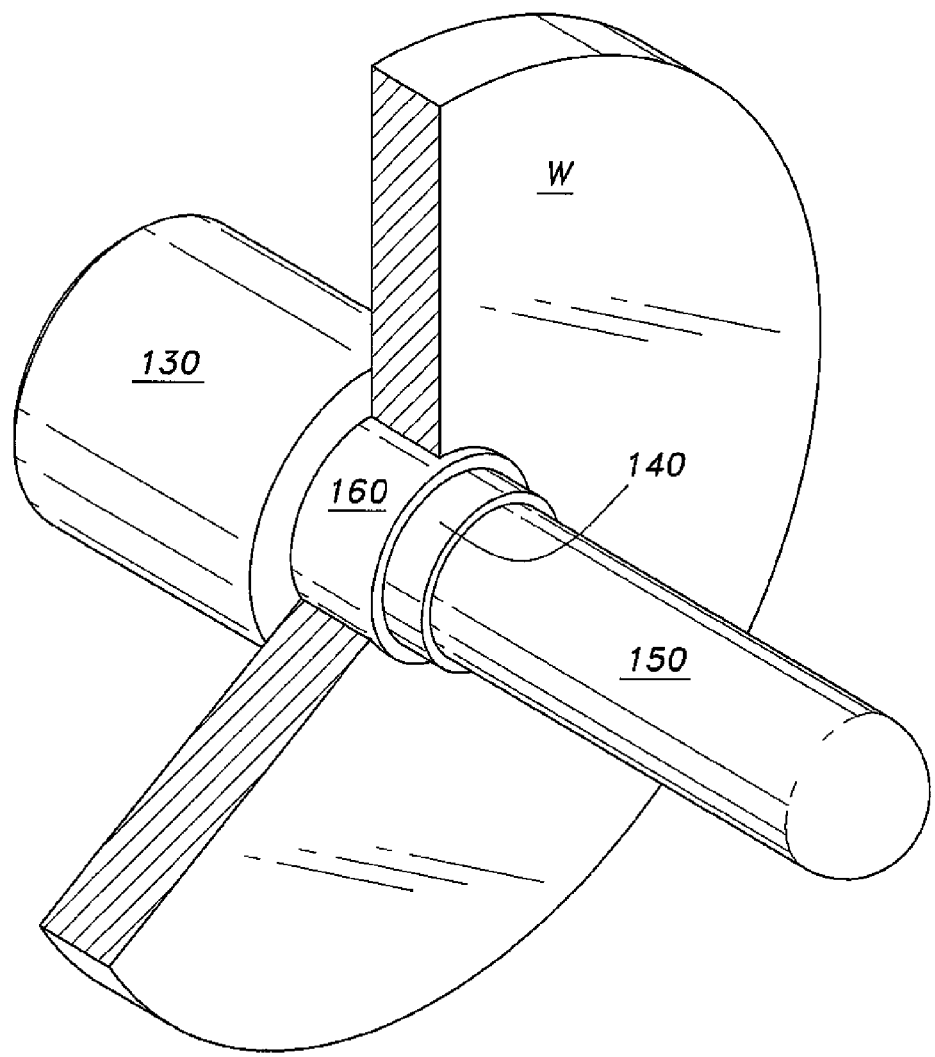
FIG. 4 is an environmental perspective view of the dual temperature sensor of FIG. 1, shown mounted in the thermostat housing of an engine as seen from inside the housing, the thermostat housing being broken away and partially in section.
Figure 5:
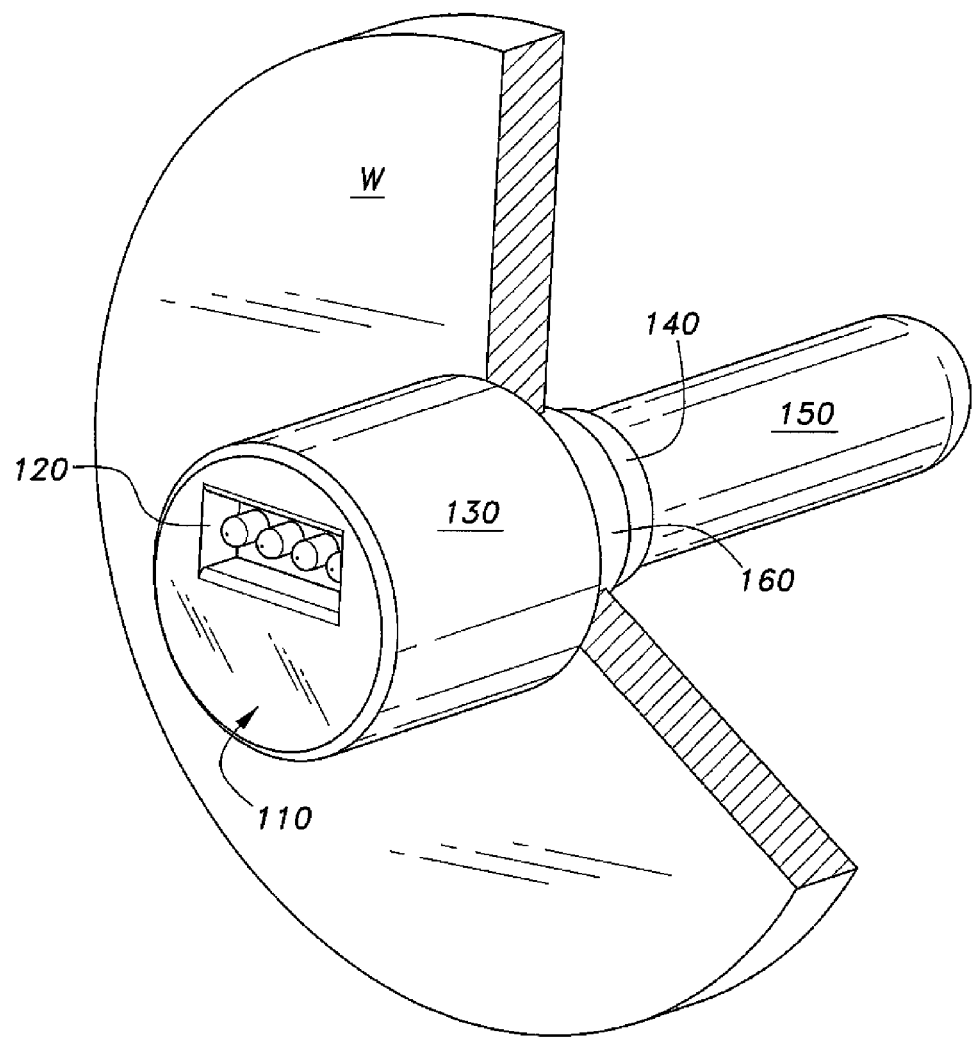
FIG. 5 is an environmental perspective view of the dual temperature sensor of FIG. 1, shown mounted in the thermostat housing of an engine as seen from outside the housing, the thermostat housing being broken away and partially in section
Figure 7:
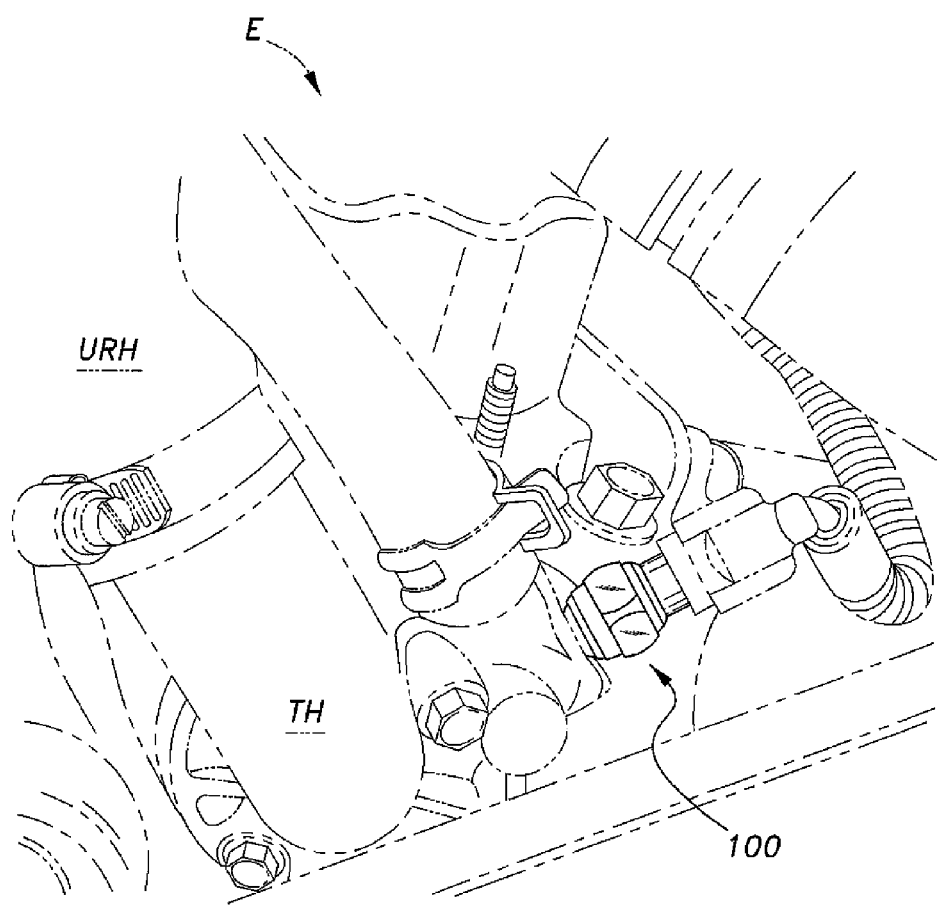
FIG. 7 is an environmental perspective view of an engine having the dual temperature sensor of FIG. 1 mounted therein.

The dual temperature sensor 100 has a plurality of electrical delivery ports 120 disposed on the top portion 110 of the sensor 100, the plurality of electrical ports 120 being configured for receiving electricity from a power source 660, such as a car battery. The sensor 100 has an insulator 140 positioned between the first sensor 135 and the second sensor 150. The dual temperature sensor 100 is mounted in the thermostat housing with the first sensor 135 extending outside the thermostat housing wall W adjacent to the engine E, and with the second sensor 150 extending inside the thermostat housing wall W in communicating relation with the engine coolant, as illustrated in FIGS. 4-5 and 7.

Figure 1:
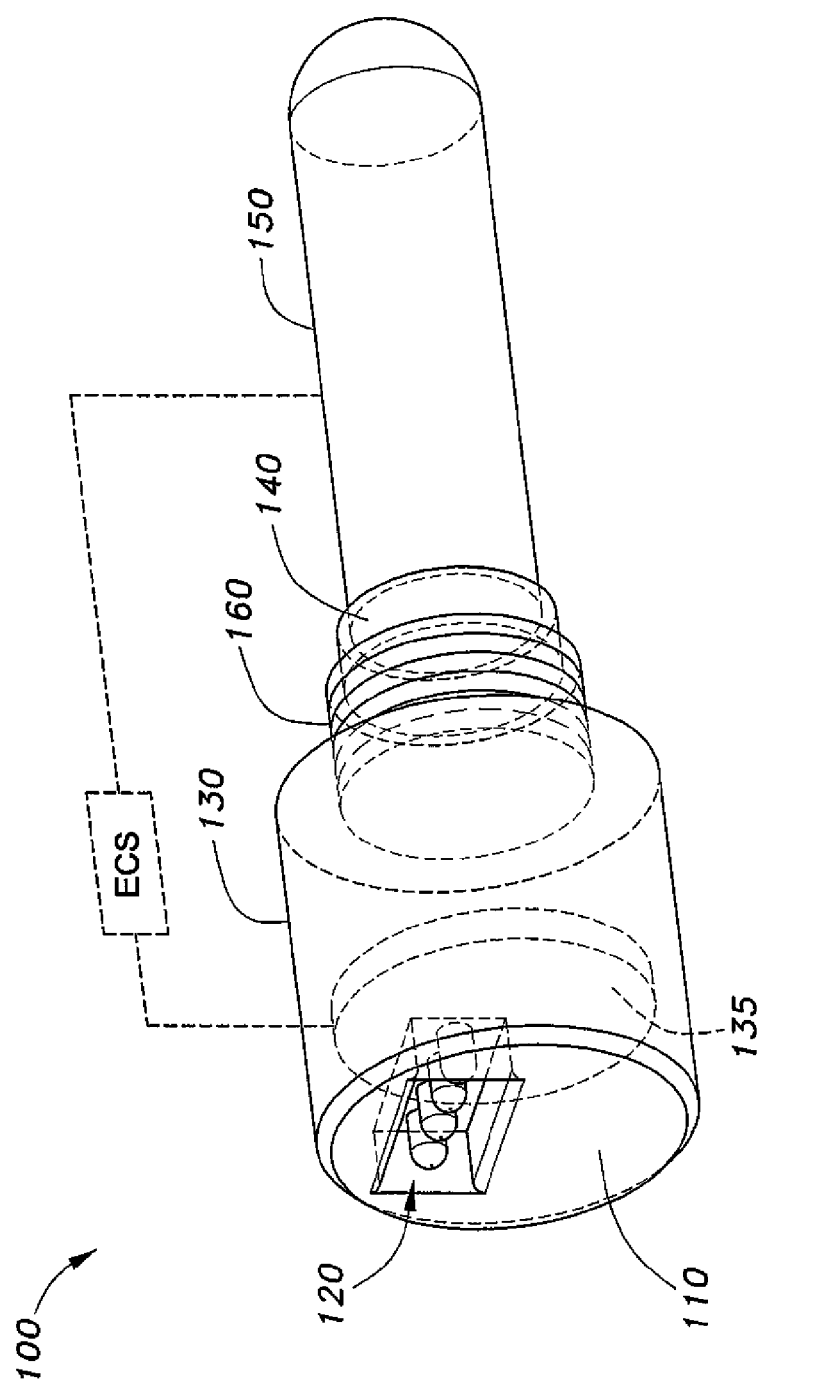
FIG. 1 is a diagrammatic perspective view of a dual temperature sensor for an engine according to the present invention.
Figure 2:
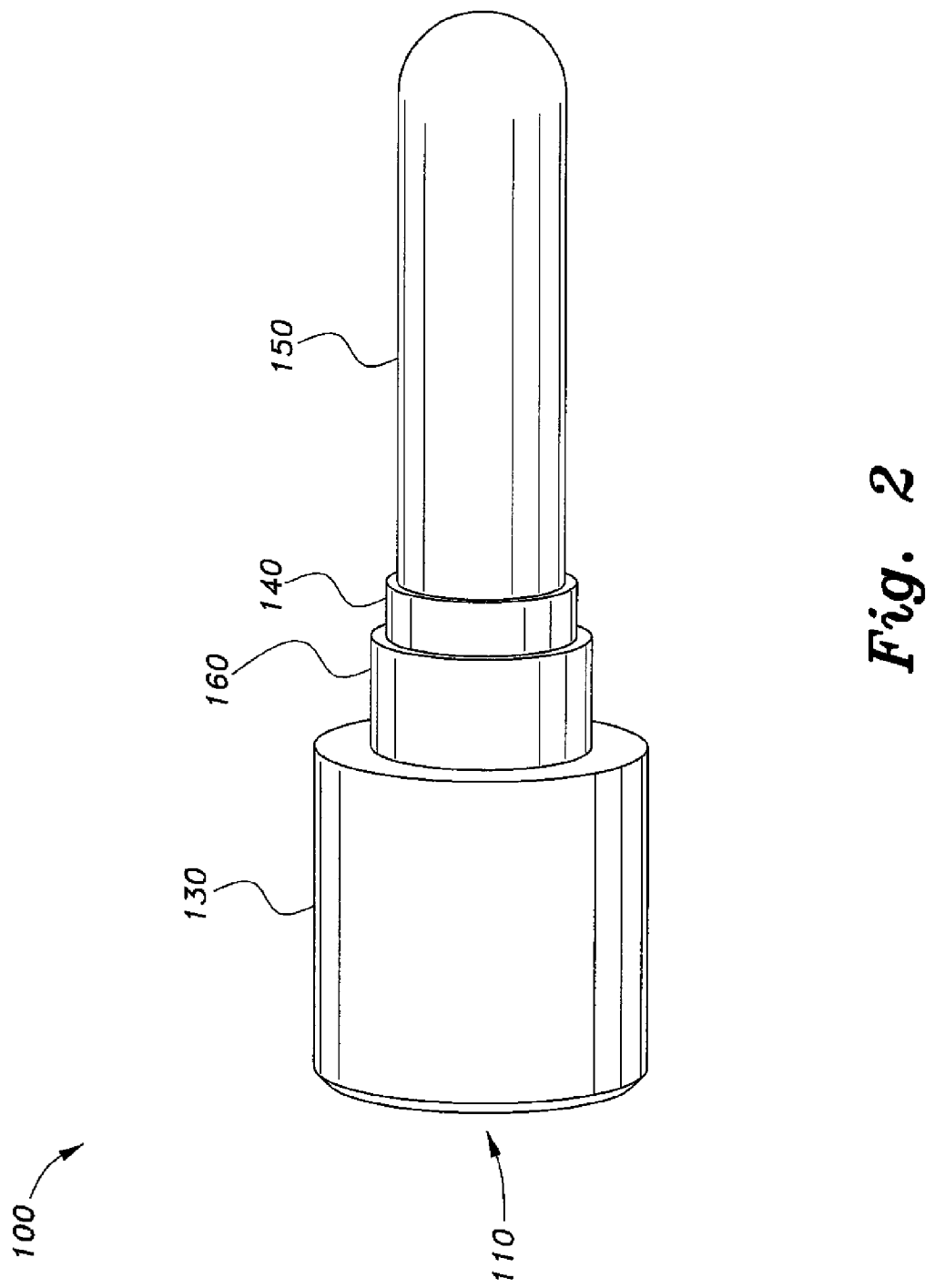
FIG. 2 is a side view of the dual temperature sensor of FIG. 1.
Figure 3:
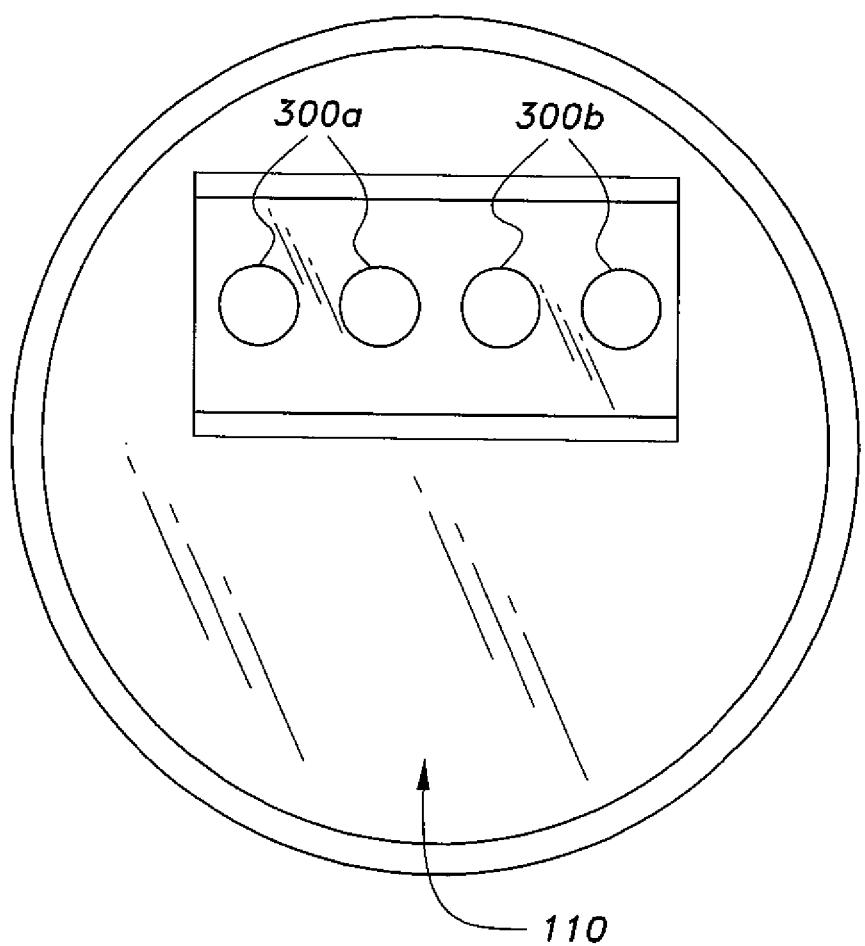
FIG. 3 is a top view of the dual temperature sensor of FIG. 1.

The dual temperature sensor 100 may have a housing 130 that houses the first sensor 135, as illustrated in FIG. 1. Further, the first sensor 135 and the second sensor 150 communicate with an engine control system ECS to activate an alert, such as an audible alarm and/or a visual alarm, if the temperature of the engine coolant and/or the temperature of the engine E rise above a predetermined temperature for a particular engine.

The top portion 110 can be made of any suitable material, such as metal, that is capable of withstanding high temperatures, e.g., between 200° F. and 250° F. Further, the top portion 110 can be coupled to the housing 130 of the first sensor 135 by any suitable means so that the top portion will not detach under high temperatures and/or pressure. The top portion 110 of the dual temperature sensor 100 has a plurality of electrical delivery ports 120 configured for receiving electricity from the power source 660 or the engine control system ECS, and terminals for the attachment of an electrical connector to deliver the signals from the sensors 135, 150 to the controller 600. Each of the plurality of electrical delivery ports 120 may be recessed in the top portion 110 of the dual temperature sensor 100. The plurality of electrical ports 120 can be grouped into a first set 300a and a second set 300b. The first set 300a can serve as the electrical ports for the first sensor 135 and the second set 300b can serve as the electrical ports for the second sensor 150.

The first sensor 135 can be any type of sensor that is well known in the art for measuring the temperature of the engine E. The second sensor 150 can be any type of sensor that is well known in the art for measuring the temperature of the engine coolant inside the engine E. The first sensor 135 and the second sensor 150 may be separated by an insulator 140 to prevent the temperature of the engine coolant, measured by the second sensor 150, from impacting the temperature reading of the first sensor 135, which should measure the temperature of the engine E itself. The housing 130 may have a threaded bottom portion 160 to allow the second sensor 150 to be threaded into the housing 130 having the first sensor 135.

Figure 6:
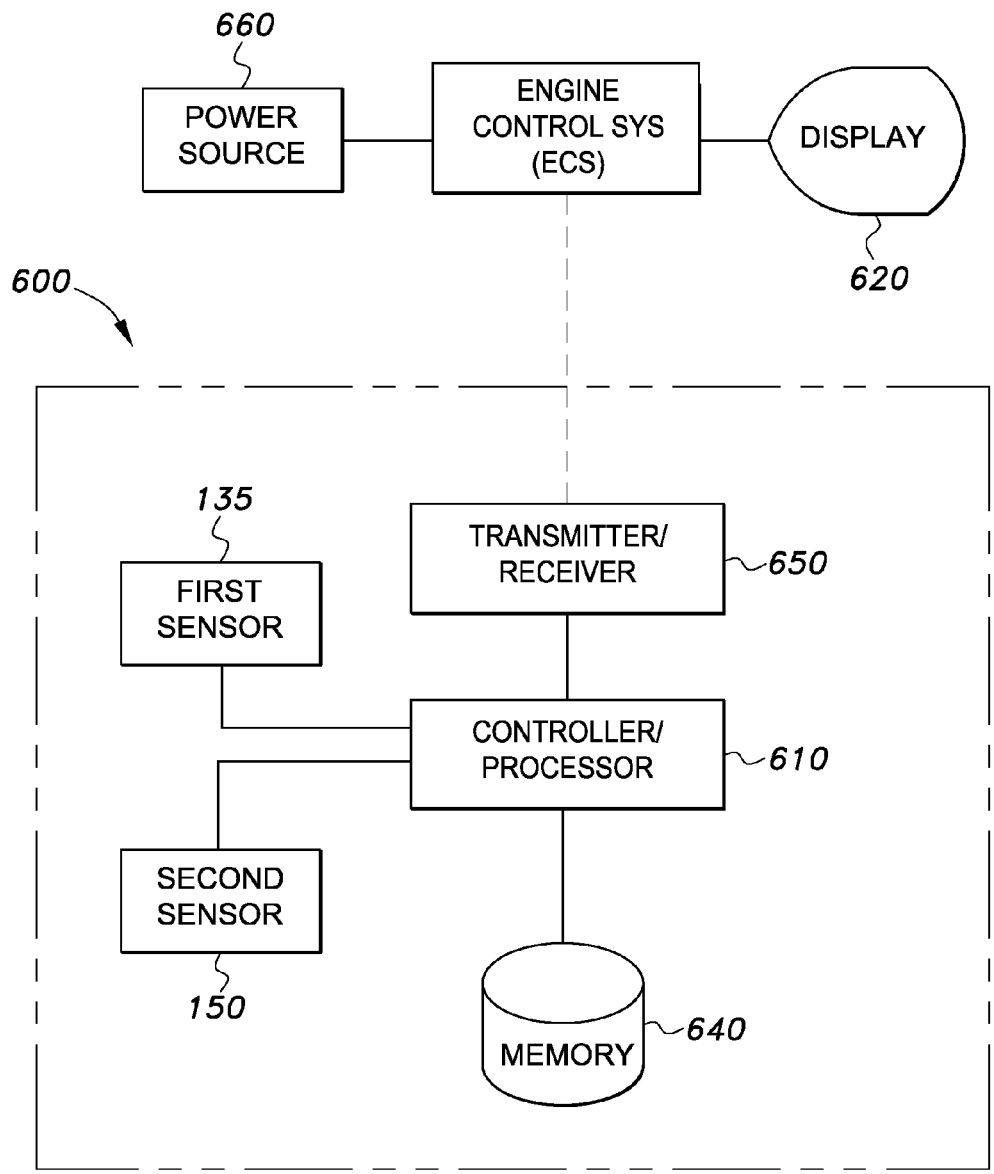
FIG. 6 is an environmental block diagram of the dual temperature sensor of FIG. 1.

FIG. 6 illustrates a block diagram of a system implementing the dual temperature sensor 100. The system 600 includes a controller 600, which may be a microcontroller, an application specific integrated circuit (ASIC), or a programmable logic controller (PLC). Data can enter into the controller 600 from any suitable type of interface, such as from the first sensor 135 and/or from the second sensor 150. Further, a transmitter/receiver 650, such as for wireless transmission/reception or for wireless communication, can be used to communicate the temperature of the engine E and/or the temperature of the engine coolant with the engine control system ECS.

The controller 600 can also include a memory 640 to store data and information, such as the temperature ranges for the engine E and the engine coolant for a particular engine, as well as program(s) or instructions for implementing operation of the dual temperature sensor 100. The memory 640 can be any suitable type of computer readable and programmable memory, such as non-transitory computer readable media, random access memory (RAM) or read only memory (ROM), for example. The controller 600 may be powered by the power source 660, such as the car battery.

Calculations, determinations, data transmission or data reception, sending or receiving of control signals or commands in relation to the temperature of the engine E and/or the temperature of the engine coolant are performed or executed by a processor 610 of the dual temperature sensor 100. The processor 610 can be any suitable type of computer processor, such as a microprocessor or an ASIC, and the calculations, determinations, data transmission or data reception, sending or receiving of control signals or commands processed or controlled by the first sensor 135 and/or the second sensor 150 can be displayed to the user of the vehicle on a display 620, such as the dashboard display of a car, or other suitable type of display.

The processor 610, the display 620, the memory 640, the transmitter/receiver 650, the first sensor 135, the second sensor 150, as well as any associated computer readable media can be in communication with one another by any suitable type of data bus, as is well known in the art.

Referring to FIG. 7, the acceptable operating temperature range for the engine and the engine coolant can fluctuate from one type of engine to another. The dual temperature sensor 100 can, therefore, be calibrated for use with different types of engines. By way of operation, since the temperature of an engine increases during use, engine coolant can be circulated throughout the engine E to ensure that the temperature of the engine E stays within an acceptable temperature range during operation and prevent overheating. For example, during the operation of the engine, a water pump (not shown) forces engine coolant into the cooling jackets (not shown) typically positioned alongside the engine E to prevent the engine from overheating. As the engine coolant flows through the cooling jackets, the heat from the engine is transferred to the engine coolant; thereby heating the engine coolant and cooling the engine. After the hot engine coolant exits from the cooling jackets, it flows through the thermostat housing TH and into the radiator (not shown), via an upper radiator hose URH, where the hot engine coolant can be cooled so that it can be re-circulated into the engine to prevent the engine from overheating.

To measure the temperature of the engine E, the dual temperature sensor 100 is mounted to the thermostat housing TH so that the first sensor 135 is positioned in communicating relation with the engine E so that the first sensor 135 can measure the temperature of the engine E. Mounting the dual temperature sensor 100 onto the thermostat housing TH also allows the second sensor 150 to be positioned in communicating relation with the engine coolant so that the second sensor 150 can measure the temperature of the engine coolant, which, in turn, can then be used to determine the temperature of the engine E. If the temperature of the engine E and/or the engine coolant exceeds the acceptable temperature range for a particular engine, the dual temperature sensor 100 can transmit a signal to the engine control system ECS to activate an alert, such as an audible alert and/or a visual alert, so that the user of the vehicle can turn the engine off before any significant damage occurs.

Even if, however, there is a leak in the upper radiator hose URH, the radiator, the lower radiator hose, or in one of the cooling jackets, which causes the engine coolant to leak out of the engine, the first sensor 135 can still determine the temperature the engine E to determine if the engine is operating within the acceptable temperature range for that particular engine. If the engine E reaches a temperature outside of the acceptable range due to the lack of engine coolant, the first sensor 135 of the dual temperature sensor 100 can transmit a signal to the engine control system ECS to activate an alert so that the user of the vehicle can turn the engine E off before any significant damage occurs.

I claim:

1. A dual temperature sensor for an engine, comprising:
   a first sensor configured for detecting the temperature of the engine and for generating at least one information signal corresponding to the detected temperature of the engine;
   wherein the detected temperature of the engine by the first sensor is detected by sensing the temperature adjacent to an external wall of the engine;
   a second sensor configured for detecting the temperature of an engine coolant and for generating at least one information signal corresponding to the detected temperature of the engine coolant;
   an insulator positioned between the first sensor and the second sensor;
   a housing containing the first sensor, the second sensor, and the insulator;

wherein the first sensor, the insulator, and the second sensor are axially aligned along an insertion direction of the housing;

a plurality of electrical delivery ports configured for receiving electricity from a power source, the electrical delivery ports being connected to the first sensor and the second sensor;

a plurality of electrical terminals connected to the first and second sensors, the terminals being adapted for communicating the first and second sensors to an engine controller through wiring; and a threaded fitting disposed between the first sensor and the second sensor, the fitting being adapted for mounting in a thermostat housing of the engine with the first sensor extending external to the thermostat housing and the second sensor extending into the thermostat housing.

2. A dual temperature sensor for an engine, comprising:

a housing having external threads adapted for mounting to a thermostat housing of the engine;

a first sensor positioned within the housing, the first sensor being configured for detecting the temperature of the engine about a vicinity adjacent to an external surface of an exterior wall of the engine, and for generating at least one information signal corresponding to the detected temperature of the engine, the first sensor extending external to the thermostat housing when the housing is mounted thereto;

a second sensor configured for detecting the temperature of an engine coolant and for generating at least one information signal corresponding to the detected temperature of the engine coolant, the second sensor extending into the thermostat housing when the housing is mounted thereto;

an insulator positioned between the first sensor and the second sensor;

wherein the first sensor, the insulator, and the second sensor are axially aligned within, and along an insertion direction of the housing;

a plurality of electrical delivery ports connected to the first sensor and the second sensor, the plurality of electrical delivery ports being configured for receiving electricity from a power source; and a plurality of terminals connected to the first sensor and the second sensor adapted for communicating the signals from the first sensor and the second sensor to an engine controller through wiring.

\* \* \* \* \*